United States Patent
Arbon et al.

(10) Patent No.: US 9,704,171 B2
(45) Date of Patent: Jul. 11, 2017

(54) METHODS AND SYSTEMS FOR QUANTIFYING AND TRACKING SOFTWARE APPLICATION QUALITY

(71) Applicant: Applause App Quality, Inc., Framingham, MA (US)

(72) Inventors: Jason Arbon, Maple Valley, WA (US); Jeffrey Carollo, Redmond, WA (US); Roy Solomon, Ashland, MA (US); Sebastián Schiavone-Ruthensteiner, Freeland, WA (US); Heidi A. Young, Woodinville, WA (US); Jason M. Stredwick, Woodinville, WA (US)

(73) Assignee: Applause App Quality, Inc., Framingham, MA (US)

( * ) Notice: Subject to any disclaimer, the term of this patent is extended or adjusted under 35 U.S.C. 154(b) by 310 days.

(21) Appl. No.: 13/910,433

(22) Filed: Jun. 5, 2013

(65) Prior Publication Data

US 2014/0156660 A1    Jun. 5, 2014

Related U.S. Application Data

(60) Provisional application No. 61/655,618, filed on Jun. 5, 2012.

(51) Int. Cl.
*G06F 17/30* (2006.01)
*G06Q 30/02* (2012.01)

(52) U.S. Cl.
CPC ................. *G06Q 30/0203* (2013.01)

(58) Field of Classification Search
CPC ............................................ G06F 17/30598
USPC ........................................................ 707/737
See application file for complete search history.

(56) References Cited

U.S. PATENT DOCUMENTS

| | | | | |
|---|---|---|---|---|
| 6,901,582 B1 * | 5/2005 | Harrison | ............... | G06F 11/328 702/119 |
| 7,337,124 B2 * | 2/2008 | Corral | ............... | G06Q 10/06 705/7.17 |
| 7,516,438 B1 * | 4/2009 | Leonard | ............... | G06Q 10/10 706/13 |
| 7,849,447 B1 * | 12/2010 | Karis | ............... | G06F 11/3664 714/100 |
| 8,543,576 B1 * | 9/2013 | Buryak et al. | ............... | 707/737 |
| 8,972,391 B1 * | 3/2015 | McDonnell | ............... | G06F 17/3053 707/727 |
| 9,367,823 B1 * | 6/2016 | Mihalik | ............... | G06F 17/3053 |
| 2002/0165859 A1 * | 11/2002 | Iyengar | ............... | G06F 17/30395 |
| 2003/0065597 A1 * | 4/2003 | Smith et al. | ............... | 705/36 |
| 2004/0103092 A1 * | 5/2004 | Tuzhilin | ............... | G06F 17/30412 |
| 2004/0172612 A1 * | 9/2004 | Kasravi | ............... | G06F 8/36 717/101 |
| 2005/0075962 A1 * | 4/2005 | Dunne | ............... | G06Q 40/00 705/36 R |
| 2006/0149575 A1 * | 7/2006 | Varadarajan | ............... | G06F 11/3616 705/7.39 |
| 2006/0195566 A1 * | 8/2006 | Hurley | ............... | 709/224 |
| 2007/0016672 A1 * | 1/2007 | Wilson | ............... | G06F 9/542 709/224 |
| 2009/0307105 A1 * | 12/2009 | Lemay et al. | ............... | 705/26 |

(Continued)

*Primary Examiner* — Noosha Arjomandi
(74) *Attorney, Agent, or Firm* — Wolf, Greenfield & Sacks, P.C.

(57) ABSTRACT

A computer-implemented method and system for quantifying and tracking software application quality based on aggregated user reviews.

18 Claims, 5 Drawing Sheets

(56) References Cited

U.S. PATENT DOCUMENTS

| | | | |
|---|---|---|---|
| 2010/0277411 A1* | 11/2010 | Yee | G06F 3/017 345/156 |
| 2010/0306191 A1* | 12/2010 | LeBeau | G06F 17/30864 707/723 |
| 2011/0258067 A1* | 10/2011 | Rowell | G06Q 30/06 705/26.2 |
| 2012/0016678 A1* | 1/2012 | Gruber et al. | 704/275 |
| 2012/0042164 A1* | 2/2012 | Gagnon | H04L 43/04 713/168 |
| 2012/0069131 A1* | 3/2012 | Abelow | G06Q 10/067 348/14.01 |
| 2012/0191694 A1* | 7/2012 | Gardiol et al. | 707/709 |
| 2012/0233165 A1* | 9/2012 | Kirkpatrick | 707/737 |
| 2012/0265814 A1* | 10/2012 | Roussis | G06Q 10/10 709/204 |
| 2013/0013492 A1* | 1/2013 | Nelson | 705/39 |
| 2013/0073618 A1* | 3/2013 | Takamura et al. | 709/203 |
| 2013/0191397 A1* | 7/2013 | Avadhanam | G06F 17/3053 707/748 |
| 2013/0231258 A1* | 9/2013 | Wilde | C12Q 1/6879 506/9 |
| 2014/0282480 A1* | 9/2014 | Matthew et al. | 717/172 |
| 2014/0282493 A1* | 9/2014 | Glover et al. | 717/176 |

* cited by examiner

METHODS AND SYSTEMS FOR QUANTIFYING AND TRACKING SOFTWARE APPLICATION QUALITY

CROSS REFERENCE TO RELATED APPLICATION

This application claims priority from U.S. Provisional Patent Application No. 61/655,618 filed on Jun. 5, 2012 entitled METHODS AND SYSTEMS FOR QUANTIFYING AND TRACKING SOFTWARE APPLICATION QUALITY, which is hereby incorporated by reference.

BACKGROUND

The present application is generally directed to methods and systems for quantifying and tracking the quality of software applications, especially applications or "apps" that run on mobile devices such as smartphones and cell phones and on tablet and other personal computers.

As mobile apps have become increasingly popular and critical to the success of many companies, monitoring app quality has become increasingly important. A variety of parties may be interested in monitoring and tracking app quality including, e.g., brands (i.e., companies associated with particular products or services), parent companies of brands, brand management firms, app developers, consumers, and market researchers.

Brands typically offer multiple applications to consumers and other users. For example, a single brand like Sports Illustrated may have multiple apps such as SI Swimsuit, SI Big Ticket, SI Football Rivals, etc. A parent company (e.g., Time Inc.) may own multiple brands (e.g., Sports Illustrated, People Magazine, and Time Magazine). Mobile apps are also often developed by outsourced firms working across brands and parent companies. The large number of apps has made tracking app quality increasingly complex and difficult for many companies and developers.

BRIEF SUMMARY OF THE DISCLOSURE

A computer-implemented method in accordance with one or more embodiments is provided for indicating the quality of a software application. The method comprises the steps of: (a) aggregating a plurality of user reviews for the software application; (b) classifying each user review of the software application into one or more quality attributes; and (c) determining a score for each of the one or more quality attributes based on the user reviews classified for the quality attribute; and (d) presenting the score for each of the one or more quality attributes for the software application.

A computer system in accordance with one or more embodiments comprises at least one processor; memory associated with the at least one processor; and a program supported in the memory for indicating the quality of a software application. The program contains a plurality of instructions which, when executed by the at least one processor, cause the at least one processor to: (a) aggregate a plurality of user reviews for the software application; (b) classify each user review of the software application into one or more quality attributes; and (c) determine a score for each of the one or more quality attributes based on the user reviews classified for the quality attribute; and (d) present the score for each of the one or more quality attributes for the software application.

DETAILED DESCRIPTION

Figure 1:
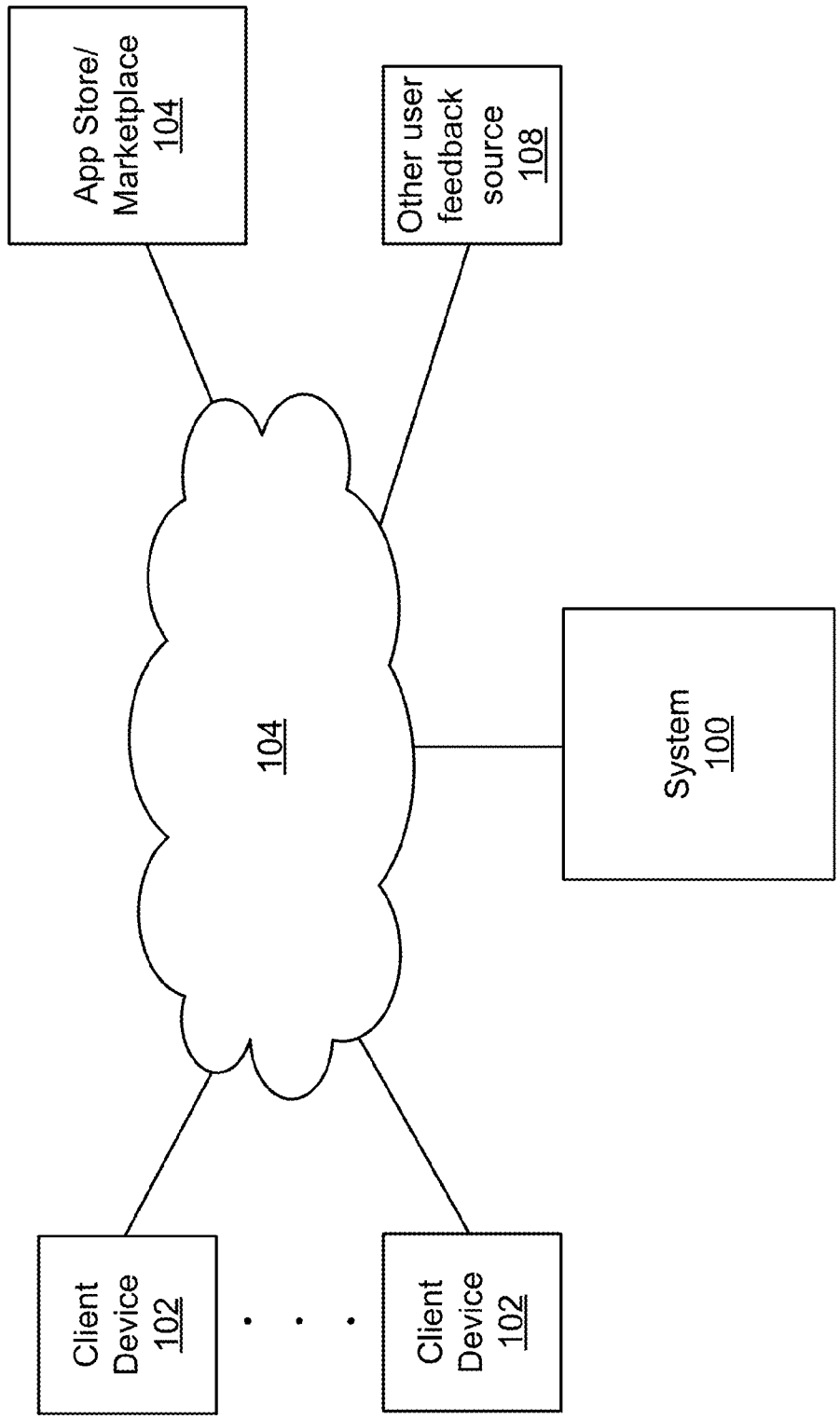
FIG. 1 is a simplified diagram illustrating an exemplary network in which a system for monitoring and tracking app quality in accordance with one or more embodiments may be implemented.

The present application is generally directed to methods and systems for quantifying and tracking the quality of software applications, especially applications or "apps" run on mobile devices such as smartphones and cell phones and on tablet and other personal computers. FIG. 1 illustrates an exemplary network in which a system for tracking app quality 100 in accordance with one or more embodiments may be implemented. The system 100 is preferably implemented in a computer server system, which communicates with a plurality of client devices 102 operated by the users of the system interested in tracking app quality.

The client devices 102 communicate with the system 100 over a communications network 104. The communications network 104 may comprise any network or combination of networks including, without limitation, the Internet, a local area network, a wide area network, a wireless network, and a cellular network.

The client devices 102 operated by users to access the system 100 can comprise any computing device that can communicate with the computer server system including, without limitation, personal computers (including desktop, notebook, and tablet computers), smart phones, and cell phones.

The system monitors and tracks app quality by aggregating app user feedback from a variety of sources including user comments in an app store/marketplace 106 and other user feedback sources 108 such as social media (e.g., Twitter tweets), automated testing services (e.g., AppGrader), crowd testing (e.g., In the Wild), and virtually any other source containing user comments.

The app quality monitoring methods and systems allow interested parties (system users 102) to visualize app quality metrics as it relates to their domain of interest. Examples of app metrics that can be tracked include, but are not limited to the following Average app store/marketplace rating (individual and per category)

Competitive ranking for quality within categories and marketplaces

Classification of user feedback into signals and quality attributes

Quality trends over time

Device and OS compatibility matrix (hardware "smoke tests")

General sentiment for quality for specific categories

Quality Attributes

Apps in app stores/marketplaces are typically rated with a simple a star rating, which is an average of all user ratings for a given app. This rating generally focuses on user sentiment and does not address specific quality issues. For example, it is difficult, if at all possible, to extract from a general one-star rating whether an app has performance issues, usability issues, or pricing issues.

Figure 2:
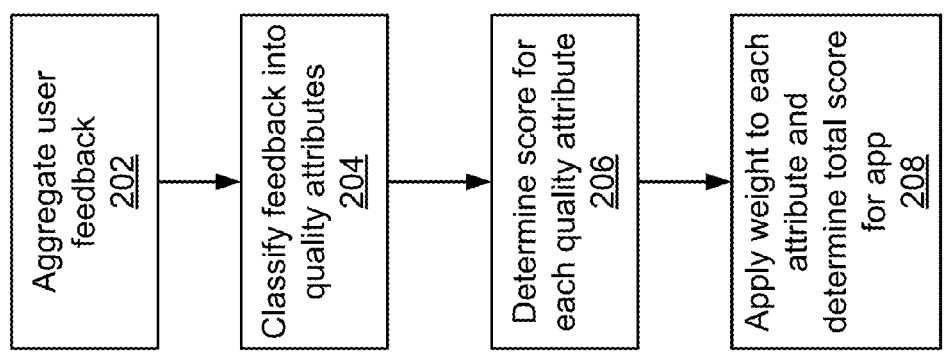
FIG. 2 is a simplified flowchart illustrating an exemplary process for monitoring and tracking app quality in accordance with one or more embodiments.

FIG. 2 is a simplified flowchart illustrating an exemplary process for monitoring and tracking app quality in accordance with one or more embodiments. At step 202, user reviews for the software application are aggregated from various sources. The term user review is intended to refer to user feedback obtained from a variety of public or private sources including app stores/marketplaces, private internal feedback systems (e.g., user feedback collected within the app itself), social media, automated testing services, or crowd testing services. The user reviews contain review text and can also include a star rating (or other rating score).

At step 204, each user review of the software application is classified into one or more quality attributes as will be described in further detail below. At step 206, a score is determined for each of the one or more quality attributes based on the user reviews classified for the quality attribute. At step 208, a weight is applied to each of the one or more quality attributes. The weight can be derived from user reviews for other software applications in a similar category to the software application. A total score is then determined for the software application based on weighted scores for each of the one or more quality attributes.

App quality is analyzed by classifying signals in quality (e.g., from user reviews of apps) into tractable/actionable attributes. A signal in quality refers to an indication of quality that can be found in the user's app review. The signals can include the text of the review as well as other aspects of the review including, but not limited to, review length, sentence structure, 'grade-level' of review text, spelling, etc. The signals include phrases such as "game is slow," "app crashes frequently," and "password sent unencrypted," etc. The signals offer valuable clues as to the quality of mobile app. The monitoring system analyzes signals in quality and classifies them into one of multiple quality attributes, thereby providing significantly more insight than simple star ratings.

Non-limiting examples of quality attributes include:

| | |
|---|---|
| Accessibility | Access to expected content/data/settings |
| Accuracy | Preciseness or correctness of content |
| Availability | Network and server availability, database connectivity |
| Content | Relevance of an app's data or content across locations and cultures |
| Elegance | Attractiveness of appearance (e.g., how cool or slick is the design of the app?) |
| Interoperability | How well an app integrates with other services or hardware |
| Localization | Translation |
| Performance | Speed, sluggishness, fps (frames per second) (how fast and responsive an app is in standard use) |
| Pricing | Cost of app or inapp upgrades (how an app's perceived value compares with its cost) |
| Privacy | Awareness of personal data, PII (personally identifiable information), email spamming, comfort with an app's terms of service and handling of PII |
| Satisfaction | How much enjoyment/fun the user had with the app How well the app satisfied the user's core expectations |
| Security | Password, encryption (perceived risk to logins, passwords or other sensitive information) |
| Stability | Crashes, hangs, uptime (how often the app crashes, hangs or freezes) |
| Usability | UX (user experience) flow, scaling, intuitiveness (ease of navigation and discoverability among an app's features) |

The methods of generating quality attributes include crawling application reviews and comments from end users in application market places. The rating score, rating text, device information, data/time, and application version number and other rating fields are examined. The fields can be examined for known word patterns, tuples/n-grams associated with different sentiments and the above quality attributes. The mechanisms used include, but are not limited to, simple substring matches, analyzing and labeling SIPs (Statistically Improbable Phrases), n-grams, and machine learning systems. Machine learning systems can also be used. These can include, but are not limited to, neural networks, markov chains and recommender systems with human judgments used as training and validation data sets. Some or all of these signals can be combined into a final score, or confidence that the given review corresponds to a quality attribute, and the relative sentiment (positive or negative).

Figure 3:
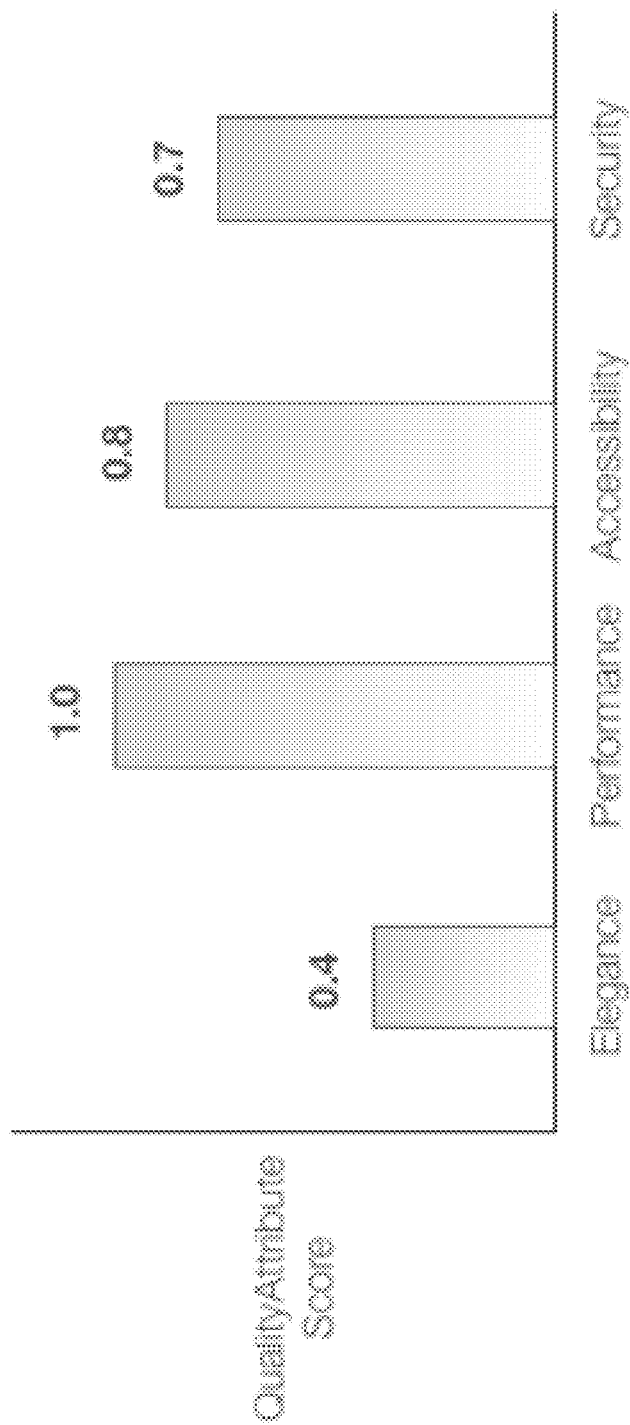
FIG. 3 is a graph illustrating one example of a subset of a quality attributes score for a given app in accordance with one or more embodiments.

FIG. 3 is a graph illustrating one example of a subset of a quality attributes score for a given app. In this graph, the higher the score, the better the quality for that particular attribute.

Certain quality attributes may be more or less consequential to apps in particular categories. For example, performance may be more consequential to Game apps than Social apps. Security may be more consequential to Finance apps than Game apps. Localization may be more consequential to Travel apps than Photography apps.

Figure 4:
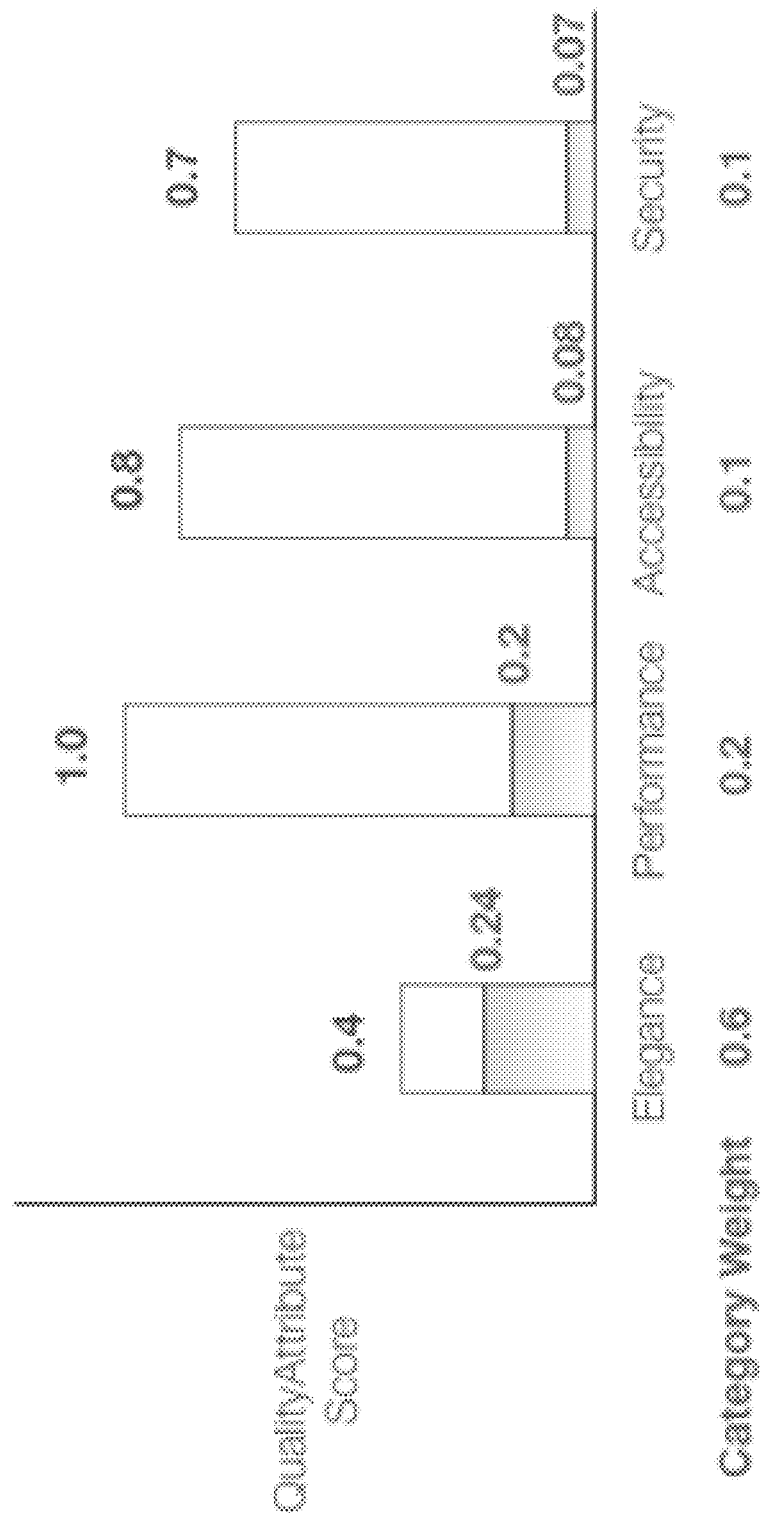
FIG. 4 is a graph illustrating one example of category weighted quality attributes scores for a particular app in accordance with one or more embodiments.

In accordance with one or more embodiments, the system accounts for this by applying a weight to each of the quality attributes, deriving the weight from aggregate reviews for each category. For example, the aggregate reviews for the Games category may show that Elegance is more important to users than Performance. FIG. 4 is a graph illustrating one example of category weighted quality attributes scores for a particular app.

Quality Rank

Figure 5:
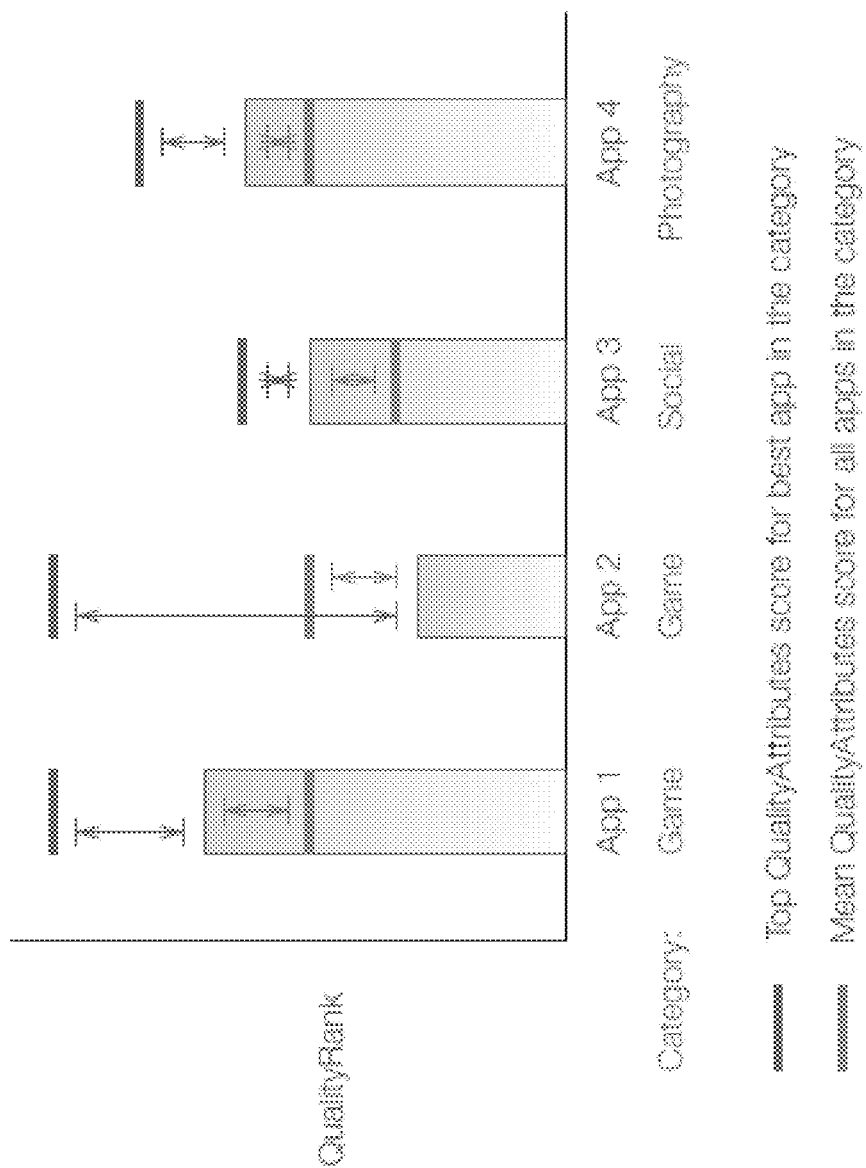
FIG. 5 is a graph illustrating one example of four apps ranked in various categories in accordance with one or more embodiments.

In accordance with one or more embodiments, the app quality monitoring system provides a quality rank score for apps. While a quality attribute score is a measure of quality for a given app, a quality rank score is a measure of how that app ranks relative to other apps, e.g., in the same category. FIG. 5 is a graph illustrating one example of four apps ranked in various categories.

Quality Trends

In accordance with one or more embodiments, the app quality monitoring system tracks Quality Trends of apps. This feature helps customers track Quality Attributes and Quality Rank for an app over time, highlighting trends, correlating events within the app ecosystem, (e.g., new version releases, OS upgrades) and getting alerts (push notifications) when thresholds are crossed.

Quality Portfolios

In accordance with one or more embodiments, users of the system can create portfolios of apps and track Quality Rank and Quality Attributes in aggregate for their portfolios. For example, a multimedia company may have a Quality Portfolio for each of their brands, and use Quality Attributes and Quality Trends to track app quality of their brands over time.

Quality Tasks

In accordance with one or more embodiments, when issues are identified by Quality Rank, Quality Attributes, and Quality Trends, customers can use Quality Tasks to build a suite of services to address quality. Some non-limiting examples are:

Better test plans (ACC (Attributes, Components, and Capabilities))
    Targeted testing focused on UX, including UX flow
    Continuous InTheWild testing
    Prerelease app reviews
    Label and correct tags (false positive signals in quality)
    Integration with bug tracking and reporting tools via API The processes of the system for quantifying and tracking applications and performing other functions described above may be implemented in software, hardware, firmware, or any combination thereof. The processes are preferably implemented in one or more computer programs executing on a programmable computer system including a processor, a storage medium readable by the processor (including, e.g., volatile and non-volatile memory and/or storage elements), and input and output devices. Each computer program can be a set of instructions (program code) in a code module resident in the random access memory of the computer system. Until required by the computer system, the set of instructions may be stored in another computer memory (e.g., in a hard disk drive, or in a removable memory such as an optical disk, external hard drive, memory card, or flash drive) or stored on another computer system and downloaded via the Internet or other network.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions. For example, the computer system may comprise one or more physical machines, or virtual machines running on one or more physical machines. In addition, the computer system may comprise a cluster of computers or numerous distributed computers that are connected by the Internet or another network. Accordingly, the foregoing description and drawings are by way of example only, and are not intended to be limiting.

What is claimed is:

1. A computer-implemented method for indicating quality of a software application, comprising the steps of:
    (a) aggregating a plurality of user reviews for the software application;
    (b) analyzing each user review of the software application for signals in quality to classify the user review into one or more quality attributes;
    (c) determining a score for each of the one or more quality attributes based on the user reviews classified for the quality attribute;
    (d) presenting the score for each of the one or more quality attributes for the software application;
    (e) wherein the act of determining the score includes applying a weight to each of the one or more quality attributes, said weight derived from user reviews for other software applications in a similar or same category to that of the software application;
    (f) determining a total score for the software application based on weighted scores for each of the one or more quality attributes;
    determining a quality rank for the software application relative to other software applications in the same category;
    tracking quality attributes or quality rank of the software application over a given period of time; and
    aggregating quality information for a plurality of software applications in a quality portfolio.

2. The method of claim 1, wherein the score is based at least in part on a user rating score provided in each user review.

3. The method of claim 1, wherein each user review is classified into one or more quality attributes based on the text of the user review, the length of the user review, or sentence structure in the user review.

4. The method of claim 1, wherein the one or more quality attributes comprise accessibility, accuracy, availability, content, elegance, inter-operability, localization, performance, pricing, privacy, satisfaction, security, stability, or usability.

5. The method of claim 1, wherein aggregating a plurality of user reviews comprises aggregating the user reviews from application marketplace, social media, automated testing services, or crowd testing services.

6. The method of claim 1, wherein the user reviews each include a rating score, rating text, device information, date/time of review, and software application version number.

7. The method of claim 1, wherein classifying each user review comprises analyzing substring matches, statistically improbable phrases, or n-grams, or by using machine learning.

8. The method of claim 1, further comprising defining one or more quality tasks based on the scores to address identified quality issues.

9. The method of claim 1, wherein the software application comprises a mobile device app.

10. A computer system, comprising:
    at least one processor;
    memory associated with the at least one processor; and
    a program supported in the memory for indicating quality of a software application, the program containing a plurality of instructions which, when executed by the at least one processor, cause the at least one processor to:
    (a) aggregate a plurality of user reviews for the software application;
    (b) analyze each user review of the software application for signals in quality to classify the user review into one or more quality attributes;
    (c) determine a score for each of the one or more quality attributes based on the user reviews classified for the quality attribute;
    (d) present the score for each of the one or more quality attributes for the software application;
    (e) apply a weight to each of the one or more quality attributes, said weight derived from user reviews for other software applications in a similar or same category to that of the software application;
    (f) determine a total score for the software application based on weighted scores for each of the one or more quality attributes;
    determine a quality rank for the software application relative to other software applications in the same category;
    track quality attributes or quality rank of the software application over a given period of time; and
    aggregate quality information for a plurality of software applications in a quality portfolio.

11. The system of claim 10, wherein the score is based at least in part on a user rating score provided in each user review.

12. The system of claim 10, wherein each user review is classified into one or more quality attributes based on the text of the user review, the length of the user review, or sentence structure in the user review.

13. The system of claim 10, wherein the one or more quality attributes comprise accessibility, accuracy, availability, content, elegance, inter-operability, localization, performance, pricing, privacy, satisfaction, security, stability, or usability.

14. The system of claim 10, wherein the plurality of user reviews are aggregated from application marketplace, social media, automated testing services, or crowd testing services.

15. The system of claim 10, wherein the user reviews each include a rating score, rating text, device information, date/time of review, and software application version number.

16. The system of claim 10, wherein each user review is classified by analyzing substring matches, statistically improbable phrases, or n-grams, or by using machine learning.

17. The system of claim 10, further comprising instructions for defining one or more quality tasks based on the scores to address identified quality issues.

18. The system of claim 10, wherein the software application comprises a mobile device app.

* * * * *